No. 769,077.

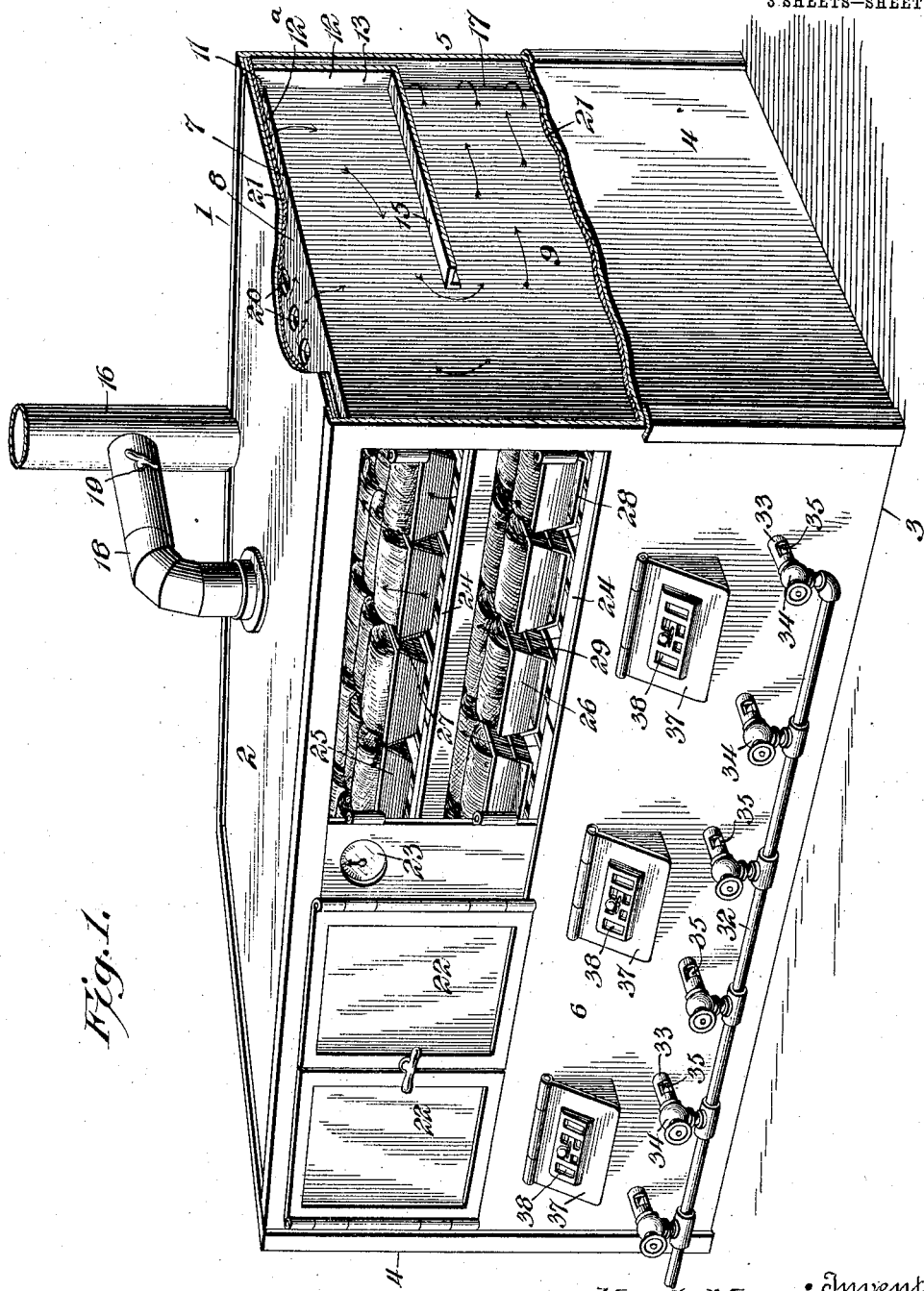

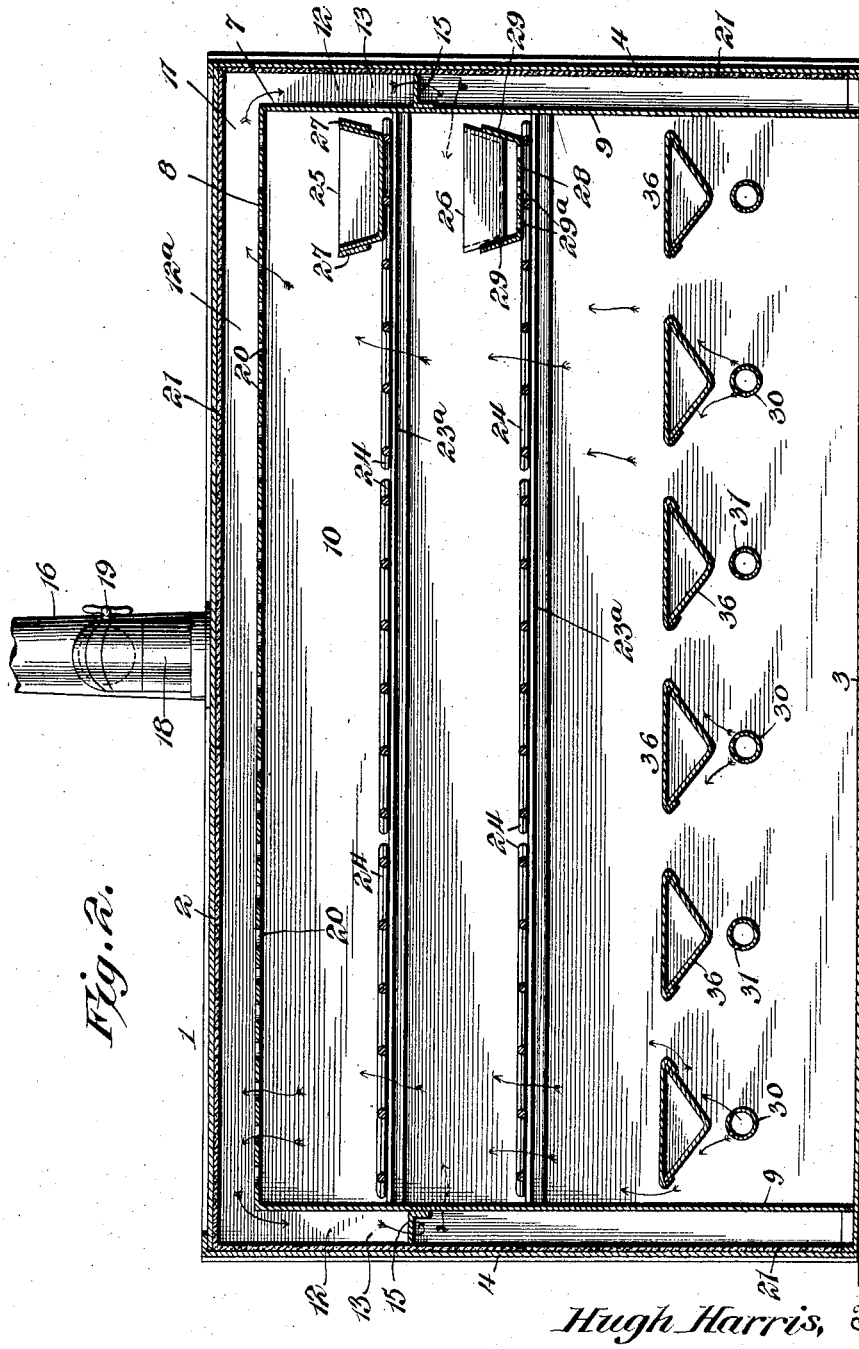

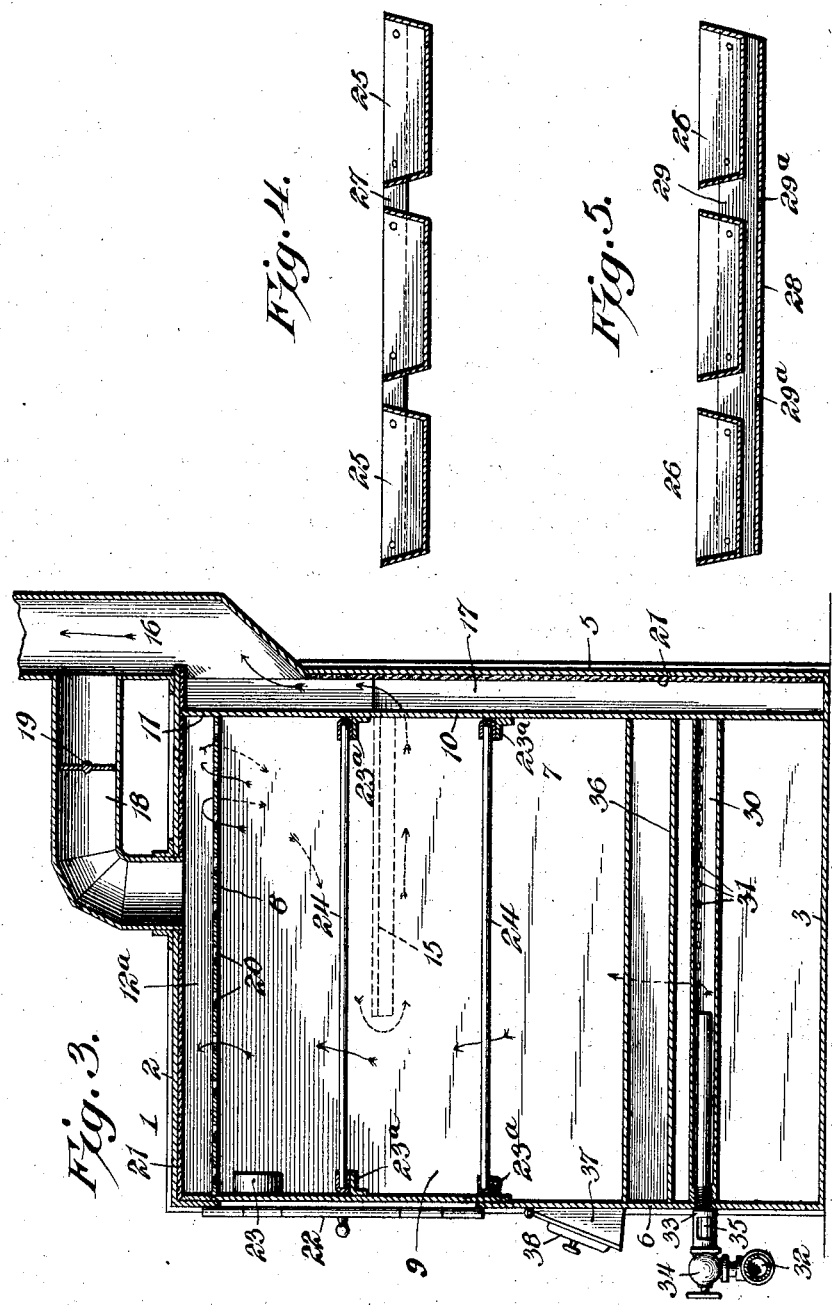

Patented August 30, 1904.

UNITED STATES PATENT OFFICE.

HUGH HARRIS, OF GALION, OHIO.

BAKING-OVEN.

SPECIFICATION forming part of Letters Patent No. 769,077, dated August 30, 1904.

Application filed July 13, 1903. Serial No. 165,369. (No model.)

*To all whom it may concern:*

Be it known that I, HUGH HARRIS, a citizen of the United States, residing at Galion, in the county of Crawford and State of Ohio, have invented a new and useful Baking-Oven, of which the following is a specification.

The invention relates to improvements in baking-ovens.

The object of the present invention is to improve the construction of baking-ovens and to provide a simple, inexpensive, and efficient one of great strength and durability, adapted to be easily manufactured and capable of advantageously employing natural gas as a fuel.

A further object of the invention is to provide a baking-oven of this character which will be especially adapted for the baking of bread, cakes, pies, and the like in large quantities and which will be capable of affording a uniform heat of the desired temperature at the expenditure of a minimum amount of fuel.

The invention also has for its object to provide a baking-oven in which the heat will pass directly through the oven and which will be provided with means for causing the heat after passing through the oven either to escape directly to the chimney or flue or to pass around the exterior of the oven, and thereby be further utilized for heating the same.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a baking-oven constructed in accordance with this invention, one pair of doors being removed and one end of the oven being partially broken away to illustrate the construction and arrangement. Fig. 2 is a longitudinal sectional view of the oven. Fig. 3 is a transverse sectional view of the same. Fig. 4 is a detail view of a set of the upper pans. Fig. 5 is a similar view of a set of the lower pans.

Like numerals of reference designate corresponding parts in all the figures of the drawings.

1 designates an outer shell or casing forming the body of the oven and consisting of a top 2, a bottom 3, ends 4, a back 5, and a front 6, all constructed of sheet metal or other suitable material and suitably connected at their adjacent edges and forming, preferably, an oblong oven, as clearly illustrated in Fig. 1 of the accompanying drawings. The oven is provided with an inner shell 7, consisting of a top 8, ends 9, and a rear wall or back 10 and spaced from the top ends and back of the outer shell or casing to form intervening passages for the heat, whereby the same may be caused to circulate around the oven proper after it has passed through the same, as hereinafter explained. The inner shell is united at its front edges with the front of the outer shell or casing and at its lower edges with the bottom of the same, and it is provided at the back of the oven with a vertical longitudinal rear wall 11, extending upward from the inner shell and arranged in the same plane as and forming a continuation of the back of the same, as clearly illustrated in Fig. 3 of the drawings, to close the top interspace or passage 12ᵃ at the back thereof. The projecting rear wall 11 extends to the end walls of the outer shell or casing, as clearly shown in Fig. 2, and it is provided with depending extensions 12, closing the upper portion of the interspace or passage 13 at the ends of the oven. The oven is provided at its ends with horizontal deflectors 15, forming walls and extending forwardly from the lower ends of the depending vertical walls or extensions 12 of the wall 11 and terminating short of the front of the oven to permit the heat to pass downward and escape at the back of the oven. The oven is provided with a flue or pipe 16, which communicates with the interspace or passage 17 at the back of the oven and which communicates also with the space 12ᵃ at the top of the oven by a pipe or flue 18, having a damper 19. The pipe or flue 18 is approximately L-shaped, and when the damper is open it permits the heat to escape directly from the top space 12ª without passing around the ends and back of the oven. The top of the inner shell is provided at intervals with perforations 20 for the passage of the heat, and the top ends and rear walls of the outer shell or casing are provided with linings 21, of asbestos or other suitable non-heat-conducting material, to prevent the outer wall or casing from becoming excessively heated and to confine the heat and the effects thereof to the inner shell which forms the wall of the oven proper.

The front of the oven is provided with doors 22, arranged in pairs at opposite sides of the center, as shown, and a suitable device for indicating the temperature of the oven may be provided, as indicated at 23, if desired. The oven is provided on its interior with front and rear supporting flanges or shelves 23ª, adapted to receive open trays or supports 24, adapted to hold baking-pans 25 and 26 or other suitable receptacles; but instead of employing the specific form of supports herein shown and described any other suitable means may be provided for supporting the baking-pans in position.

The baking-pans, which may be of any desired number, are preferably arranged in sets of three, the pans of each set being connected by side pieces 27 to enable the pans of the set to be simultaneously removed from and placed in the oven or otherwise handled. The lower pans are connected by a shield 28, having sides 29, which are secured to the side walls of the pans. The bottom of the shield is spaced from the bottom of the lower pans, as clearly illustrated in Fig. 5, and is provided with perforations 29ª, located opposite the spaces between the pans to permit the heat to pass upward through the said spaces to the upper pans. By this arrangement the heat from the burners 30 is prevented from cooking the contents of the lower pans too rapidly and is distributed oven the oven, so that the same is uniformly heated. The contents of the upper and lower pans will thereby be uniformly baked, and a large quantity of bread, pies, and cakes may be simultaneously and properly baked or otherwise cooked. The oven is also adapted for roasting meats and other cooking and may be advantageously employed for all the purposes to which an ordinary oven may be used. The bottom shields, while protecting the lower pans, permit the heat to pass upward to the upper pans and the heat passes both around the shields and through the same.

The burners 30, which may be of any desired construction and of any desired number, preferably consist of transverse tubes provided at opposite sides with perforations 31, forming jet-openings. The natural gas is fed to the burners through a supply-pipe 32, arranged at the front of the oven, and a suitable gas-mixer 33 is provided for each of the burners. A cock or valve 34 is also provided for each of the burners for enabling the flow of gas to be controlled, whereby the oven may be readily heated to and maintained at the desired temperature. The tubular gas-mixer 33 is provided with suitable apertures 35, and it screws into the outer end of the burner-tube, extending into the same at a suitable distance, as clearly illustrated in Fig. 3 of the drawings. A deflector 36 of approximately triangular form is arranged over each of the burners and presents lower oppositely-inclined faces to the same. Each burner-tube is provided with two rows of the perforations 31, and these rows are located at opposite sides of the burner, as clearly shown in Fig. 2. The heat is deflected and distributed throughout the oven by these deflectors, which are arranged at intervals, as shown, and they prevent a too rapid upward movement of the heat and coöperate with the shields of the lower pans, which also operate as deflectors. The deflectors 36 are preferably constructed of sheet metal and are hollow, as shown; but they may be constructed in any other desired manner, as will be readily understood.

The oven is provided at its front with doors 37, hinged at the top and arranged at the front, as shown, and provided with ventilating-apertures and having suitable dampers or closures 38 for the same, whereby the draft through the oven is controlled. These doors also afford access to the burners for enabling the same to be ignited and inspected.

The heat from the burners passes upward around the deflectors to the lower set of pans, passing around the latter and through the openings of the shields thereof to the upper pans. The openings of the top of the inner shell permit the heat to enter the top space or passage 12ª, from which the heat may be permitted to escape directly to the chimney or flue through the tube or pipe 18, or the heat may be caused to pass over the top of the inner shell to the ends thereof and down the end spaces or passages and around the horizontal walls or deflectors 15 to the rear space or passage 13. By this arrangement the heat after passing through the oven and directly acting upon the contents of the pans may be utilized for heating the exterior of the inner shell, and thereby maintaining the oven in a highly-heated condition.

In practice the pans are designed to contain each two loaves of bread, and it will be apparent that an oven of this character is capable of baking a large number of loaves at each baking.

It will be seen that the heat deflectors or spreaders, which are located directly above the burners and which are provided with oppositely-inclined lower faces, are adapted to distribute the heat uniformly over the entire oven and that by means of the ventilating-openings of the lower doors 37 and by controlling the flow of the gas the oven may be uniformly heated and maintained at the desired temperature.

What I claim is—

1. A baking-oven, comprising inner and outer shells having intervening spaces or passages extending from the top of the inner shell around the sides and back of the same to form circuitous passages, and a flue extending upward directly from the top of the oven and communicating with the interior of the same to provide a direct escape for the heat, said flue having means for controlling the passage of the heat, substantially as described.

2. A baking-oven provided at the top with a heat-escape, burners located within the oven at the lower portion of the same, and hollow approximately triangular heat-deflectors located above the burners and presenting oppositely-inclined faces to the same, said deflectors being arranged in a row and forming upwardly-converging intervening spaces, substantially as described.

3. A baking-oven provided with a heat-escape and having in its walls passages extending from the top of the oven and communicating thereat with the interior of the same, whereby the heat may be caused to pass directly through the oven and over the top, ends and back of the same to the heat-escape, burners located at the bottom of the oven within the same, and hollow approximately triangular heat deflectors or distributers located above the burners and presenting oppositely-inclined faces to the same, said deflectors being arranged in a row and forming upwardly-converging intervening spaces, substantially as described.

4. A baking-oven having a heat-escape and provided in its walls with passages extending from the top of the oven and communicating thereat with the interior of the same, whereby the heat may be caused to pass directly through the oven and over the top, ends and back of the same to the heat-escape, burners located within the oven at the bottom thereof, heat deflectors or distributers located above the burners, and upper and lower receptacles, the lower receptacles being provided with shields having openings and forming heat-distributers, substantially as described.

5. A baking-oven provided at the bottom with a heating device located within the oven, and upper and lower pans, the lower pans being provided with shields arranged at the bottom of the pans and provided with openings and adapted to distribute the heat, substantially as described.

6. A baking-oven provided at its bottom with an interior heating device, and upper and lower receptacles, the lower receptacles being arranged in sets, and spaced apart, each set being provided with a bottom shield having openings at the spaces between the pans and adapted to distribute the heat, substantially as described.

7. A baking-oven provided at its bottom with an interior heating device and having a heat-escape at the top, heat distributers or deflectors located above the heating device, and upper and lower receptacles arranged in sets, each set of the lower receptacles being provided with a shield having sides connected with the receptacles, the bottom of the shield being provided with openings, substantially as described.

8. A baking-oven comprising inner and outer shells spaced apart, the inner shell being provided at the top with openings, a wall arranged at the top of the oven and separating the spaces or passages at the top and rear of the oven, means for partially separating the end and rear spaces, deflecting devices extending from the said means and located within the end spaces to provide a circuitous passage for the heat, and a flue extending upward from the top of the oven to provide a direct passage for the heat, substantially as described.

9. A baking-oven comprising inner and outer shells spaced apart, the inner shell being provided at the top with openings, a top wall interposed between the top and rear spaces and provided at the ends with depending extensions terminating short of the bottom of the oven, deflecting-walls extending from the said extensions and terminating short of the front of the oven, and a flue extending upward from the top of the oven to provide a direct passage for the heat, substantially as described.

10. A baking-oven comprising inner and outer shells spaced apart, the inner shell being provided at the top with openings, a top wall interposed between the top and rear spaces and provided at the ends with depending extensions terminating short of the bottom of the oven, deflecting-walls extending from the said extensions and terminating short of the front of the oven, a flue communicating with and extending from the rear space for the escape of the heat, and a flue or passage having a damper or cut-off and extending directly from the top space to the said flue, substantially as described.

In testimony that I claim the foregoing as my own I have hereto affixed my signature in the presence of two witnesses.

HUGH HARRIS.

Witnesses:
 HARRY G. ANICK,
 ROY O. BURNISON.